United States Patent [19]

Brown et al.

[11] 4,372,199

[45] Feb. 8, 1983

[54] ROTARY SKEWER COOKER

[75] Inventors: Leo F. Brown; R. S. Myerly, both of Chillicothe, Ohio

[73] Assignee: Wear-Ever Aluminum, Inc., Chillicothe, Ohio

[21] Appl. No.: 233,775

[22] Filed: Feb. 12, 1981

[51] Int. Cl.³ .............................................. A47J 37/04
[52] U.S. Cl. .................... 99/341; 99/421 V; 403/334
[58] Field of Search ............... 99/341, 421 R, 421 P, 99/421 V, 444, 446, 443 R; 219/389, 392; 126/41 A; D15/104, 108, 106; 403/14, 13, 333, 334

[56] References Cited

U.S. PATENT DOCUMENTS

| D. 252,090 | 6/1979 | Julkenbeck | 99/421 V X |
|---|---|---|---|
| 1,790,488 | 1/1931 | Saunders et al. | 99/341 X |
| 2,019,170 | 10/1935 | Barlow | 99/421 R |
| 2,049,481 | 8/1936 | Walterspiel | 99/341 X |
| 2,517,360 | 8/1950 | Singer | 99/443 R |
| 2,549,019 | 4/1951 | Saunders | 99/341 |
| 2,622,506 | 12/1952 | Finizie | 99/421 V |
| 2,687,080 | 8/1954 | Dorin | 99/421 V X |
| 2,810,598 | 10/1957 | Lief | 403/334 |
| 3,009,410 | 11/1961 | Murphy | 99/421 V |
| 3,221,638 | 12/1965 | Wickenberg | 99/421 P |
| 3,331,310 | 7/1967 | White | 99/421 V |
| 3,604,341 | 9/1971 | Coroneos | 99/421 V |
| 3,744,403 | 7/1973 | Castronuovo | 99/421 V |

FOREIGN PATENT DOCUMENTS

| 2641126 | 3/1978 | Fed. Rep. of Germany | 99/421 R |
|---|---|---|---|
| 2822298 | 12/1978 | Fed. Rep. of Germany | 99/421 P |

*Primary Examiner*—Billy J. Wilhite
*Attorney, Agent, or Firm*—Wood, Herron & Evans

[57] ABSTRACT

A cooker of the type having a series of vertically oriented skewers disposed in a circle about a central vertically oriented heating element, the skewers being individually rotatable relative to the heating element. In this rotary skewer cooker environment, this invention is directed to a novel skewer chimney structure which promotes even cooking of food on the skewers as well as easy removal for cleaning, and a novel skewer drive mechanism which allows the individual skewers to be easily removed and reinstalled during use of the cooker.

6 Claims, 7 Drawing Figures

ROTARY SKEWER COOKER

This invention relates to cookers. More particularly, this invention relates to a rotary skewer cooker.

Rotary cooking is a very well known and very old method of cooking food. The cooking of food by placing it on a spit or skewer, and then rotating that skewer over a heat source, is very, very old. Initially, such cooking techniques were no doubt used over the open campfire. More recently, and in the case of outdoor grills used in suburbia or elsewhere, food is grilled on a spit or skewer oriented horizontally over a heat source. In such grills, normally there is only one, or at most two, spits or skewers horizontally positioned over the heat source, and each skewer normally may be rotated about its axis if desired by the user. Such outdoor grills have made use of charcoal beds, electric heating elements, and gas burners as the heat source.

It is also known, however, to provide a rotary skewer cooker in which the skewers are vertically oriented. In this type cooker there may be, for example, four or six skewers that are vertically oriented on a circular locus of points with a heat source (e.g., an electric heating element) vertically positioned centrally of that circular locus. The skewers are rotated by a drive mechanism located in a base, one end of each skewer being connected with that drive mechanism during the cooking cycle. Each skewer rotates about its own axis only, and does not rotate around the centrally positioned heating element. This type of rotary skewer cooker has been made and sold in the retail consumer marketplace, and is particularly directed to indoor use where it is useful in cooking a number of different types of foods. This type of rotary skewer cooker also can be sized so that it is easily portable, thereby allowing foods to be cooked in rooms of the home other than the kitchen. In other words, this type of cooker has been marketed for use in the home's dining room or in the den or in the playroom. Such a rotary skewer cooker is useful in preparing hors d'oeurvre or entrees or snacks, and is useful in preparing any type of food or food combination that normally may be cooked on a skewer. Such foods, of course, include meats, fish, vegetables, fruits or the like.

There have been a couple of problems associated with rotary, vertical skewer cookers of the prior art which have been marketed to the retail consumer. In the first place, the prior art rotary cookers of which we are aware have provided enclosure structures for the skewers which are relatively difficult to clean in that same are not always easily removable and reinstallable with the cooker's base. Also, such enclosure structures are not always structured to promote optimum cooking of food on the skewers. A second problem area associated with the prior art rotary, vertical skewer cookers is found in the area of the skewer drive mechanism. It is desirable that the individual skewers be easily removable and easily reinstallable with the skewer drive mechanism while the drive mechanism is operating, i.e., while the cooker is in use. This for the reason that it is often preferred by the user to fill one or more skewers with fresh uncooked food, and/or to relieve one or more skewers of cooked food, without disturbing the cooking of food on other skewers while the cooker is in use. Also, it is important that the skewers' interconnection with the drive mechanism be structured so that grease or other food drippings from the food cooked on the skewers does not foul, i.e., does not come in contact with, that mechanism.

Therefore, it has been one objective of this invention to provide an improved rotary, vertical skewer cooker having a novel skewer chimney structure, that structure cooperating with the cooker's base and the cooker's skewers to permit relatively even cooking of the food on the skewers, and to permit ease of removal and reinstallation of the chimney with the cooker's base.

It has been another objective of this invention to provide an improved rotary skewer cooker with a novel skewer drive mechanism, that mechanism including a specially structured connector at one end of each skewer that permits a skewer to be easily disengaged from and re-engaged with that skewer's drive while the drive mechanism is rotating other skewers, yet prevents fouling of the skewer drive which might otherwise occur due to food drippings which run down the skewer.

Other objectives and advantages of this invention will be more apparent from the following detailed description taken in conjunction with the drawings in which:

FIG. 7 is a schematic diagram showing the electric circuit of the rotary skewer cooker.

Figure 1:
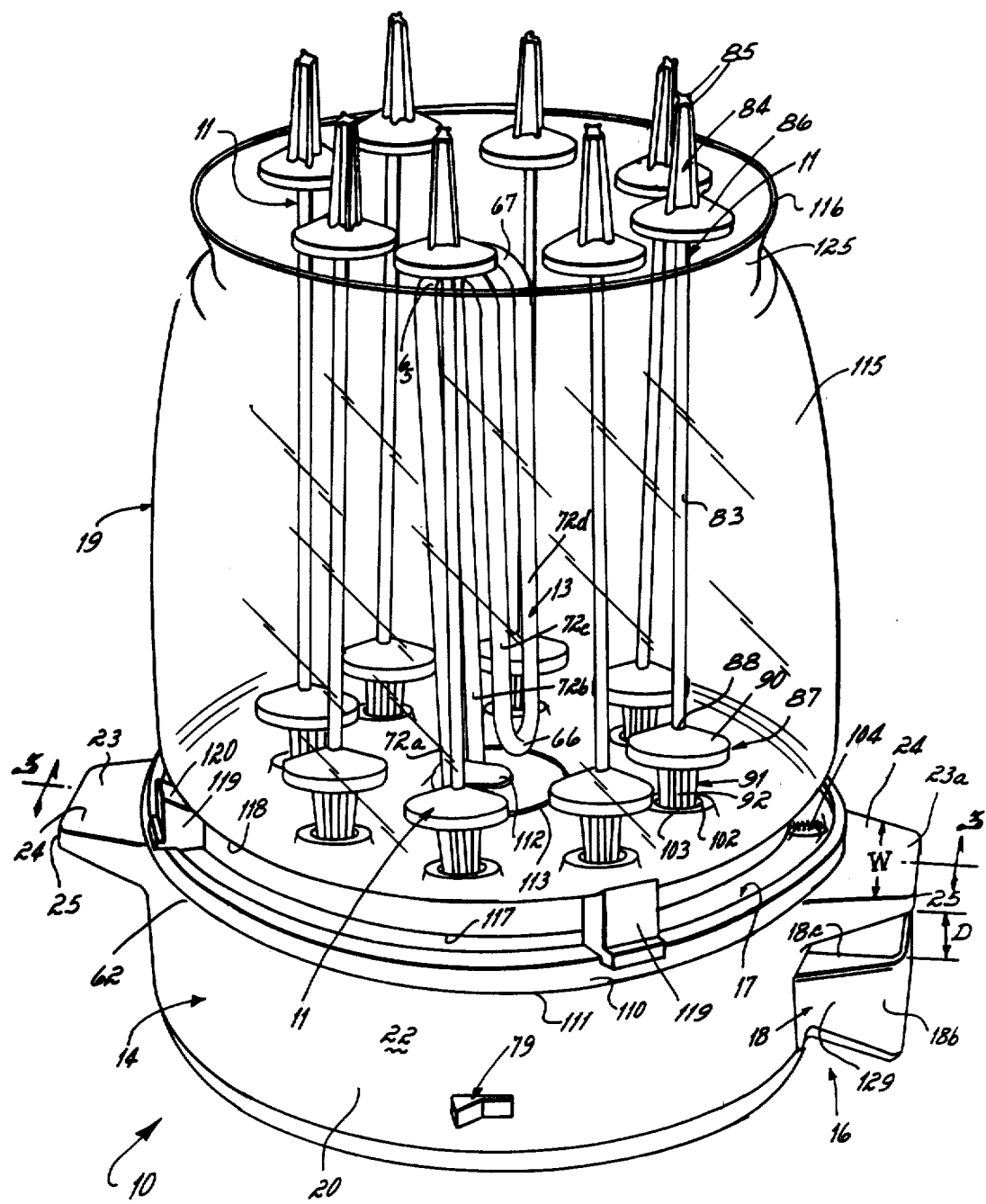
FIG. 1 is a perspective view of an improved rotary skewer cooker in accord with the principles of this invention.
Figure 2:
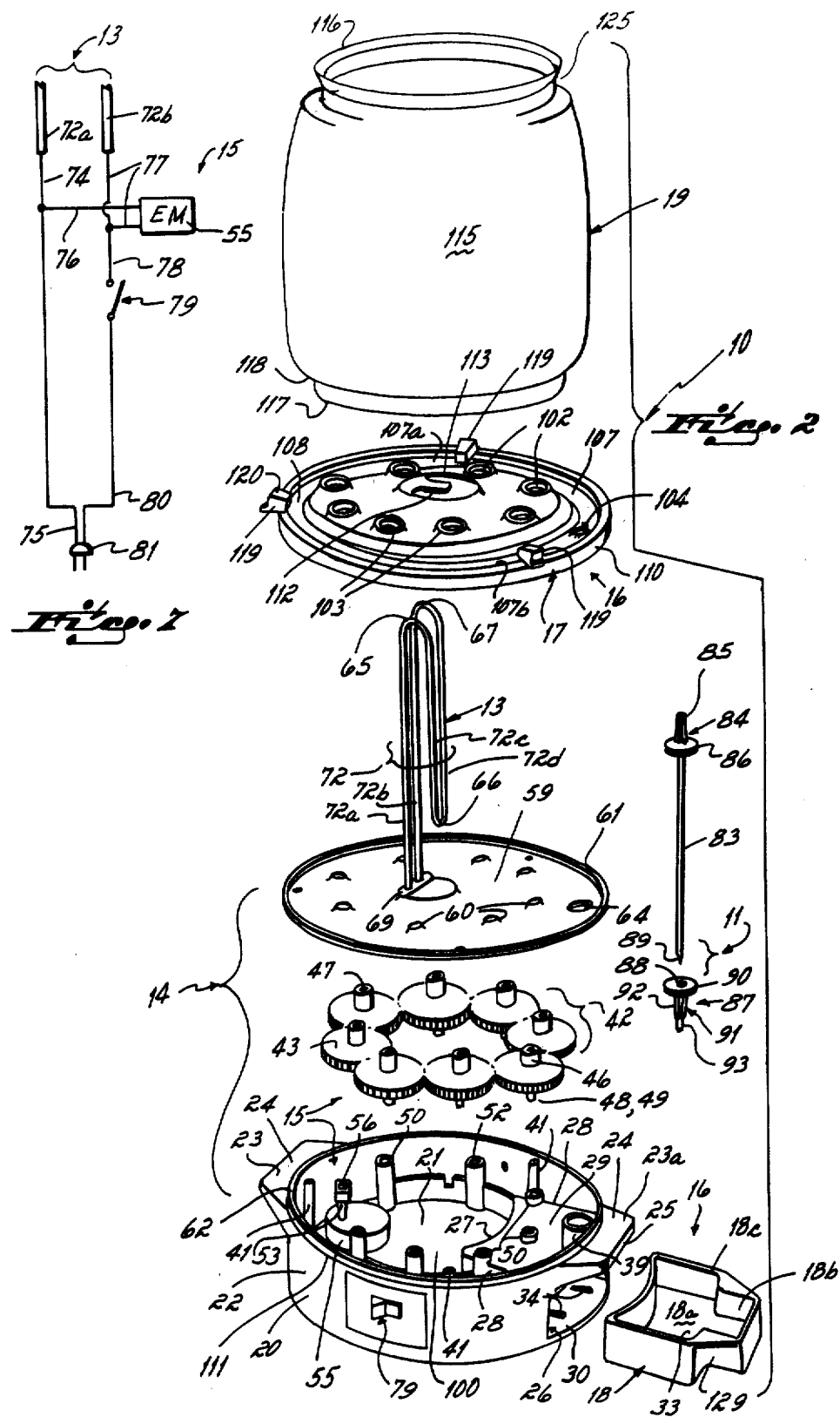
FIG. 2 is an exploded perspective view of various components of the rotary cooker shown in FIG. 1.

The rotary skewer cooker 10 of this invention, as illustrated in FIGS. 1 and 2, basically includes a series of skewers 11 (eight being shown) which are vertically oriented (relative to ground) and are positioned on a circular locus 12 of points. A vertically oriented electric heating element 13 is positioned centrally of the circular locus 12. Both the skewers 11 and the heating element 13 are vertically supported on a base 14 that encloses a skewer drive mechanism 15 for rotating all of the skewers. The base also includes a food drippings removal assembly 16 which incorporates drip tray 17 and collector cup 18 for receiving and temporarily storing the grease and food drippings of food cooked on the skewers 11. The base 14 also supports a transparent skewer enclosure 19 for promoting even cooking of food on the skewers, as well as preventing the splattering of grease or other food drippings to the environment of the cooker during use.

Figure 3:
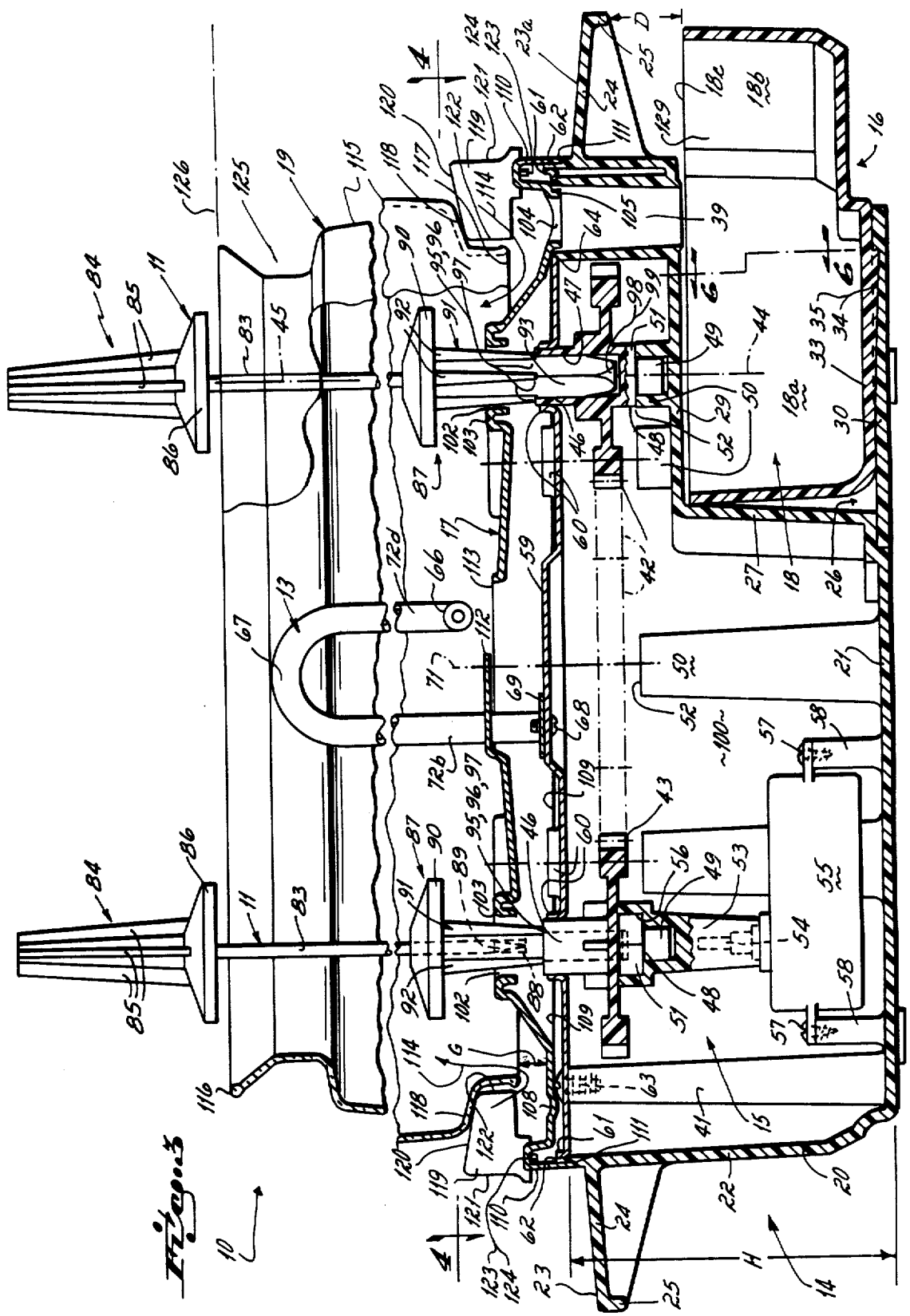
FIG. 3 is a cross-sectional view taken along line 3—3 of FIG. 1.
Figure 4:
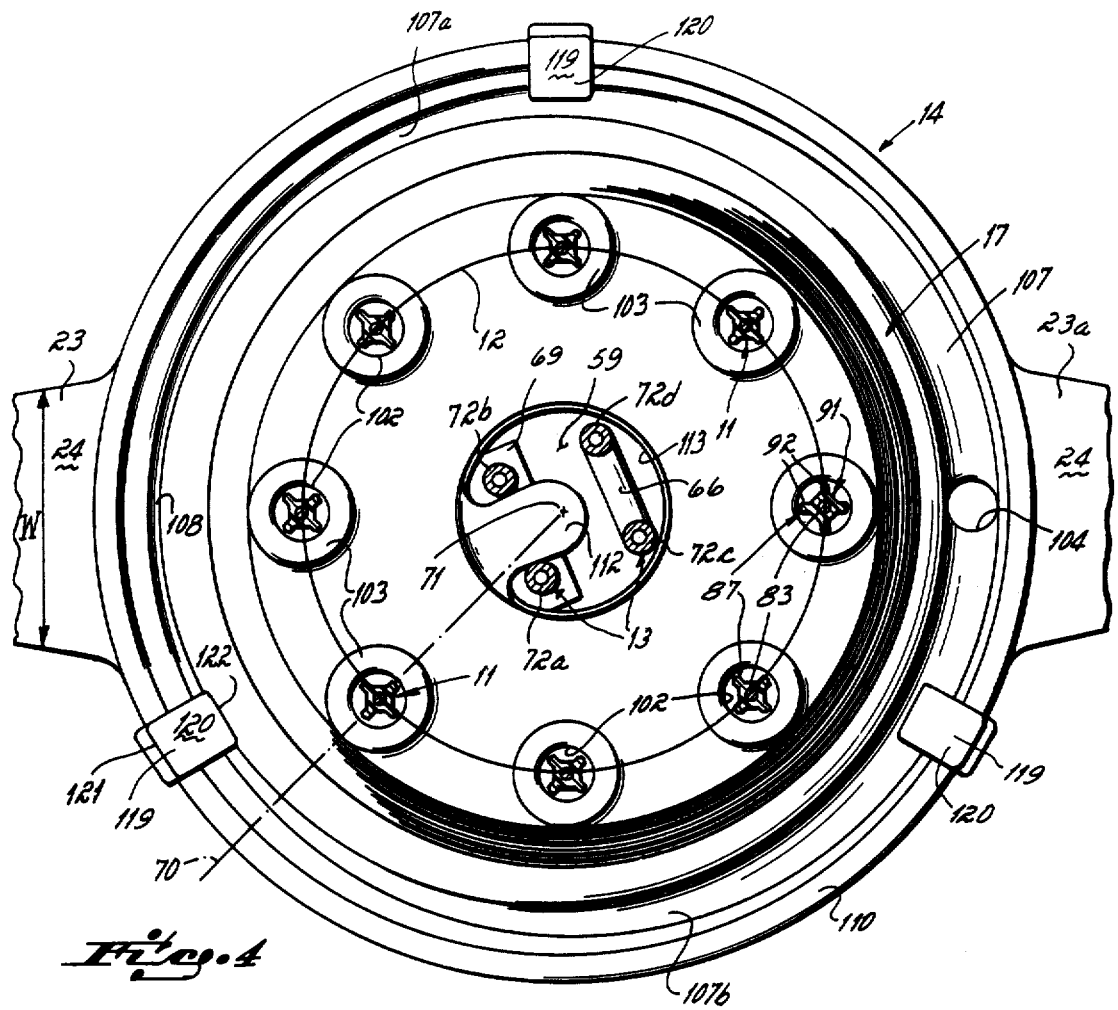
FIG. 4 is a cross-sectional view taking along line 4—4 of FIG. 3.

The base 14 of the rotary skewer cooker 10 is particularly illustrated in FIGS. 2-4. The base 14 includes a housing 20 fabricated of a one-piece configuration that establishes a floor 21 and a circular sidewall 22. Two handles 23 are formed on opposite sides of the housing 20 and extend radially outward therefrom, each of the handles including a handle plate 24 of width W and an outer lip 25 that protrudes downwardly from the handle's free edge. A pocket 26 is formed within the housing, and extends radially inward of the housing's sidewall 22 from a position underneath one 23a of the handles. The housing's pocket 26 is provided with inner wall 27, opposed sidewalls 28 and a top wall 29, all formed integral with the housing. The pocket's floor is in the form of a separate floor plate 30 which contains latches 31 that interfit with slots 32 formed in the housing to hold that floor plate in fixed relation with the housing. This pocket 26 is sized, between its inner wall 27 and sidewalls 28, to receive and to position collector cup 18 in its desired use location when the cup 18 is pushed all the way into the pocket. Note, as shown in FIG. 3, the collector cup 18 has a major portion 18a sized to fit in freely sliding relation within the pocket, and a hollow handle portion 18b sized to extend beyond the housing's sidewall 22 when the cup is fully received within the pocket 26. The collector cup's hollow handle portion 18b enlarges the drippings capacity of the cup, and the handle portion 18b is sized and structured to be located beneath the housing's handle 23a so it is not inadvertently used as a handle for the base 10. Note that the top edge 18c of the cup 18 is spaced a substantial distance D beneath the housing handle's lip 25, and this structural relation, along with the hollow interior structure of the cup's handle 18b, permits the interior of the cup to be viewed by the cooker's user, thereby allowing the user to determine easily the level of drippings in the cup for deciding whether or not the cup should be emptied during use of the cooker 10. The underside of the cup's floor 33 is provided with ribs 34 which interfit with grooves 35 in the top face of the housing's floor plate 30 to prevent the collector cup from inadvertently sliding out if the cooker is tipped when the cup is positioned within the pocket 26. The ribs 34 and grooves 35 are relatively shallow, and this tends to restrain the collector cup 18 within the pocket 26 unless and until it is specifically removed by a user. There also is a drain pipe 39, formed integral with the pocket's ceiling 29, which defines a conduit for food drippings from the drip tray 17 into the collector cup as explained in detail below.

The skewer drive mechanism 15 is also carried mainly within the base 14. That portion of the skewer drive mechanism 15 positioned within the base's housing 14 includes a series of seven idler gears 42 and one drive gear 43, the gears 42, 43 being meshed in planetary fashion with each gear's center line 44 coinciding with its associated skewer's axis 45. Each of the gears 42, 43 is fabricated of a one-piece plastic configuration. The half axle 46 on the top side of each gear 42, 43 defines an axial square bore 47 therein, same being adapted to cooperate with a skewer 11 as explained in detail below. The half axle 48 on the underside of each idler gear includes a cylindrical shaft 49 that fits in freely rotating relation with an associated tubular support post 50 molded integral with the base's housing 20. Square bearing flange 51 on the underside of each idler gear 42 bears on the top edge 52 of its associated gear support post 50, that top edge defining a bearing surface for the gear. The driven gear 43, which is identical to idler gear 42, is received in adaptor 53 fixed to drive shaft 54 of motor 55. The adaptor 53 provides a square seat 56 sized to receive the square bearing flange 51 on the underside of the gear in a non-slip fit, thereby providing a driving connection between the motor's drive shaft 54 and the driven gear 43. The motor 55 itself is fixed to the housing's floor 21 by screws 57 that are received in motor posts 58. Since the driven gear 43 is meshed with the idler gears 42 on either side thereof, and all idler gears are meshed with other gears on each side thereof, the entire planetary gear train 42, 43 is driven by the electric motor 55 through that driven gear when rotation of the gears (and, therefore, rotation of the skewers 11 as explained in further detail below) is desired.

A base plate 59 is interfitted with the gears 42, 43 and the housing 20 to close the otherwise open top of the housing. This base plate 59 is of a circular configuration, and is provided with a series of upraised bosses 60 adapted to receive the square bore half axles 46 of the gears. In other words, these upraised bosses 60 are positioned in a circular locus of points identical to, and adapted to overlie, the circular locus of points defined by the gear support posts 50 molded integral with the housing's floor 21. The base plate 59 is further provided with an upturned lip 61 around its entire circular periphery, the upturned lip being received interiorly of the housing's upper edge 62 when assembled therewith for the purpose of insuring concentricity of the housing and proper vertical orientation of the skewer gears' axes 44. The base plate 59 is held in fixed relation with the housing 20 through use of screws 63 received in screw posts 41 also formed integral with the housing's floor 21. The height H of these screw posts 41 is such as to properly position the base plate 59 vertically with the housing 20 relative to the skewer gears 42, 43. The base plate 59, therefore, when assembled with the housing 20 and the gears 42, 43, cooperates with the gear posts 50 formed integral with the housing to maintain the gear axes 44 vertical, thereby helping to maintain the skewers 11 vertical when they are rotated through innerconnection with the gears. Further, the base plate 59 includes a port 64 at the periphery thereof which is sized to surround the drippings conduit 39 formed integral with the housing 20.

A heating element 13, which is comprised of a triple hair pin loop 65–67 configuration, is mounted in generally vertical orientation on the housing's base plate 59. The heating element 13, which is in the nature of an electrical resistance heater element, is fixed to the base plate 59 by screws 68 and bracket 69. The heater element 13 is attached to the base plate 59 in such a position that when each skewer 13 is viewed along a radial line of sight 70 that includes the base's center axis 71, all of the four legs 72 of the heater element are exposed to food on that skewer. The heater 13 itself may be a wire wound resistance heater with an exterior sheath. The triple hair pin loop 65–67 configuration is desirable because it permits the heater 13 to operate at a lower sheath temperature than a single or double post heater relative to the total wattage necessary to provide the desired heat. In practice, and in preferred form, it has been determined that a 1000 watt electric resistance heater 13 which operates at 120 volt house current, and that develops a 1300° F. to 1400° F. sheath temperature, is useful in the cooker 10 of this invention. One end leg 72a of the resistance heater 13 is connected by lead 74 to one electric line 75, and that same leg 72a of the heater is connected by lead 76 to the motor 55, see FIG. 7. The motor's other lead 77 is connected to the other end leg 72b of the resistance heater 13, and that other end leg of the heater is connected by lead 78 to one pole of off/on switch 79. The other pole of the off/on switch 79 is directly connected to the other electric line 80. The electric lines 75, 80 are, of course, provided with plug 81 to make the rotary skewer cooker usable in a home environment.

Figures 5, 6:
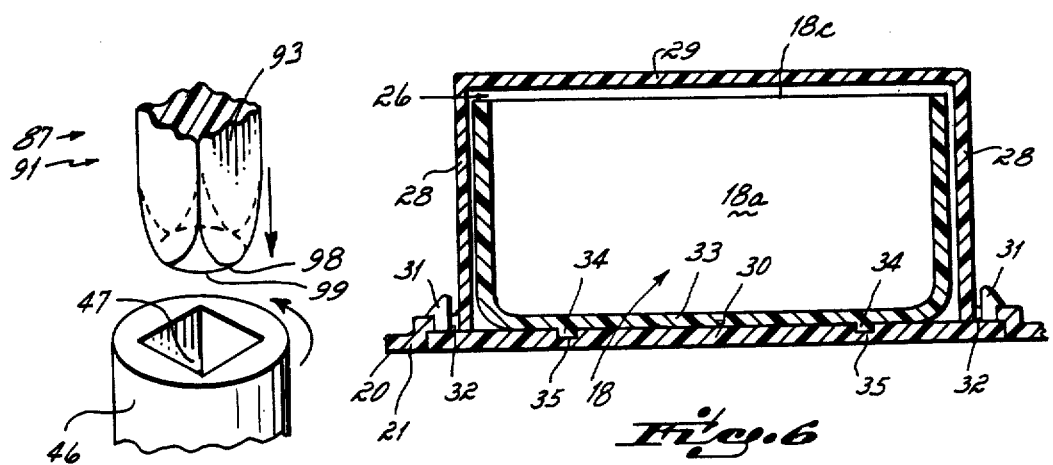
FIG. 5 is an enlarged view of a part of the cooker's skewer drive mechanism.
FIG. 6 is a cross-sectional view of a part of the cooker's drippings collector cup taken along line 6—6 of FIG. 3.

Each skewer 11 is in the form of a metal rod 83 which has a handle 84 permanently fixed thereto at its upper end. The handle 84 is permanently fixed to the skewer rod 83, and includes ribs 85 which make the skewer 11 easier to handle by its user. The handle 84 also includes conical flange 86 which aids in preventing finger contact of the user with the skewer rod 83 when it is hot. Preferably the handle 84 is molded of a low heat conductivity plastic so it does not become unduly hot during use of the cooker 10. The bottom end of each skewer 11, however, is provided with a removable connector 87. Preferably, the connector 87 is also molded of a low heat conductivity plastic so it also does not become unduly hot during use of the cooker. The removable connector 87, as shown in FIGS. 2, 3 and 5, functions as a component of the skewer drive mechanism 15, and also functions as a handle at the skewer's lower end when the skewer 11 is removable therefrom, through blind bore 88 that is sized to receive the skewer rod's point end 89 in a friction fit connection therewith. The friction fit is such that a user may remove and reinstall the connector 87 on the skewer 11 without significant effort, but is also such that the connector will not come off the skewer without a removal force being exerted thereon by the user. The friction fit also preferably is such that the connector 87 will not slip off the skewer 11, even with food bearing against it when the skewer is held vertically as it is installed or removed fully loaded with the drive mechanism 15. This, of course, prevents the food (and particularly cooked food) from accidentally slipping off the skewer 11 as the skewer is handled by the user when it is not connected with the drive mechanism 15.

The removable connector 87 includes a downwardly flaring conical drip deflector 90 which extends radially outward from the top of a post 91. The post 91 is provided with the blind bore 88 into which the pointed end of skewer 11 is received in friction fit. The deflector 90 end of the post 91 is provided with ribs 92 (analogous to ribs 85 on handle 84) which make the connector 87 easier to grip by the user, thereby enhancing its handle function. The free end 93 of the post 91 is of a square cross-sectional configuration, and is sized to be received in driven relation with the square bore 47 of any gear's axle 46. All square bores 47 of all gears' axles 46 are of identical cross-sectional configuration and size, and all the square shafts' ends 93 of all connectors 87 are of the same configuration but of a slightly smaller size, thereby permitting any connector (and, thereby, any skewer 11) to be received in driven relation with any of the idler 42 or drive 43 gears. Each square post 91 also includes a bearing seat 95 defined by ends 96 of ribs 92 on that post which, through cooperation with end edge 97 of a gear's shaft 46, provides a limit stop that limits insertion of the connector 87 into a gear's square bore 47. Note, of course, that the shaft's square bore 47 is of a depth at least as great as that length of the post 91 without ribs 92. Importantly, the square post 91 is tapered or radiused, as at 98, at its free end to establish a generally circular cross-sectional configuration at the end thereof as at 99, see FIG. 5. This conical end 98, 99 to each square post 91 is quite important in that it allows the cooker's user to easily install the skewer's connector 87 in a gear's square bore 47 while the gear 42 or 43 is turning since perfect registry between the connector's square post 91 and the gear's square bore 47 is not required to start entry of the connector's post into the gear's bore. And such reinstallation is easily made when the skewer 11 is being held on by handle 84 since perfect registry is not required between square post 91 and square bore 47 when initiating reconnection between same. Further, it is important to note that the blind bore 88 in the connector 87, in cooperation with the drip deflector 90, eliminates all possibility of food grease or drippings from passing downwardly through the skewer's connector 87, and through the base plate 59, into the base's interior 100. This, of course, keeps such drippings out of contact with the gears 42, 43 and other parts of the drive mechanism 15, which in turn prevents fouling of the drive mechanism and eliminates any need for periodic cleaning of same or the housing's interior 100.

The food drippings removal assembly 16, which includes collector cup 18, also includes drip tray 17. The drip tray 17 overlies the housing's base plate 59 and, in effect, constitutes the top wall of the base 14. The drip tray 17, which is shown in FIGS. 3 and 4, includes a series of ports 102 through which the skewers' connectors 87 extend, and which are positioned to overlie the respective gears' shafts 46. A boss 103 is provided around each of these ports, which boss is smaller in cross-sectional area than is the cross-sectional area of the associated connector's drip deflector 90. This structural relation insures that drippings which drip or fall off the connectors' deflectors 90 fall onto the drip tray 17, and not through the drip tray's ports 102 down onto the housing's base plate 59. The drip tray 17 is provided with a drain hole 104 that includes collar 105 sized to fit through drain hole 64 in the housing's ceiling plate 59, and down into drippings conduit 39 molded integral with housing 20, to insure transfer of drippings from drip tray into the cup 18 without loss. The drip tray 17 is further provided with a circular trough 107 around the exterior periphery thereof, the trough being pitched or slanted from a point 108 opposite the drain hole 104 in a downwardly sloping direction in semi-circular paths 107a, 107b toward the drain hole. This pitching of the annular trough 107 insures that drippings which drain into the trough after falling on the drip tray 17 will drain around to the drain hole 104 and through the drain hole into the collector cup 18. The drip tray 17 is further characterized by a downwardly slanting surface 109 thereof which slants downwardly from the center of the drip tray toward the trough 107 to insure that drippings which fall anywhere on the drip tray are directed to the pitched trough 107. The drip tray 17 may be coated with a non-stick material if desired.

The drip tray 17 also includes an annular inverted U-shaped channel 110 around its exterior periphery. This channel 110, as shown in FIG. 3, is sized to fit over the exterior peripherty of the housing 20 at the top edge 62 thereof, and is received in seated relation with an exterior annular groove 111 defined around the housing's top edge. This interfit of the tray's annular flange 110 with the housing's annular seat 111 insures that the pitch of the drip tray 17 will be as intended relative to the drain hole 104, and that drippings on the tray will drain from the center thereof toward the periphery thereof and from point 108 in the drip tray's trough 107 toward the drain hole, when the drip tray is assembled with the housing. The drip tray 17 is not connected to the base by any mechanical fasteners, but simply rests thereon as so located by the tray's flange 110 cooperating with the housing's annular seat 111 as previously explained. This allows the drip tray 17 to be easily removed for cleaning when cleaning is desired simply by lifting it vertically upward until it clears the heater element 13. It is important to note that the drip tray 17 also includes a tongue 112 which extends interiorly into a large center cut-out 113, that cut-out being sized to allow the drip tray to slide vertically over the heater element 13. In this regard, the drip tray 17 cannot be properly located on the housing in operative combination therewith unless the tongue 112 is received between those two legs 72a, 72b of the triple loop heater element 13 which extend upwardly from the housing's ceiling plate 59. When so properly oriented, same insures that the drip tray's drain hole 104 will overlie the drain conduit 39 molded integral with the housing 20. In other words, the drip trays tongue's interfit with the heater element 13 provides a fail-safe feature that insures the drip tray 17 cannot be assembled incorrectly with the base 14 since any such attempted incorrect assembly would result in interference of the tongue 112 with heater element 13.

A skewer chimney structure 19, as previously mentioned, is also incorporated with the rotary skewer cooker 10 of this invention. The skewer chimney structure 19 includes a glass chimney or cover 115 of a generally tubular configuration, i.e., open at both upper 116 and lower 117 ends to atmosphere. The chimney 115, at its lower end 117, is provided with an inwardly and downwardly depending annular flange 118 that provides part of the means by which it is supported relative to the base 14. The drip tray 17 mounts three seats 119 equally spaced one from the other around the periphery of the tray, the seats being characterized by a downwardly sloping upper support surface 120 that slopes downwardly from the outer periphery 121 of the tray toward the center thereof, and by a generally vertical inner step surface 122. Each of these seats 119 is mounted to the drip tray 17 by a screw 123 through slot 124 in the tray. In assembly with the base 14, the glass chimney 115 merely sits on top of the drip tray's seats 119, it being retained in generally coaxial position with the base's center axis 71 by virtue of the interference between the cover's annular flange 118 and the seat's inner faces 122. To remove the chimney 115 from assembly with the base 14, one need merely grip the top edge 116 thereof so as to lift the chimney vertically out of operative combination with the base until it clears the skewers' handles 84. The finger channel 125 is in the nature of an outwardly opening groove which allows the top edge 116 of the chimney 115 to be readily gripped by a user. As shown in FIG. 3, and when the glass chimney 115 is in assembly with the base 14, note particularly that a phantom plane 126 which includes the chimney's top edge 116, which plane is normal to the vertical axis 71 of the base, is in a position such that only the handles 84 of the skewers 11 extend above same. In other words, substantially the entire length of the skewer rods 83 are enclosed within the glass chimney 115, and the entire heating element 13 is enclosed within the glass chimney, i.e., positioned beneath the phantom plane 126. This, of course, prevents substantial splattering of food drippings into the environment surrounding the cooker 10, substantially all such splattering being restrained by the chimney, which being transparent, allows ready viewing of the food as it is cooked on the skewers. Note further that, because the chimney's bottom edge 117 is supported above the drip tray's trough 107 by seats 119, an air gap G is created between the chimney 115 and the base 14 through which air flow 114 can occur during use of the cooker. This air flow 114, which is a convection induced air flow up through the chimney due to heat generated within the enclosure 115 by heater 13, may enhance cooking of the food as discussed in detail below. Also this air flow 114 tends to cool food drippings in the tray's trough 110 before same passes into cup 18, and tends to keep the skewers' handles 84 cool enough to touch by the cooker's user.

Use of the vertical skewer rotary cooker 10 of this invention by a retail consumer is quite simple and easy. Initially, and with the cooker assembled as shown in FIGS. 1 and 3, the skewers 11 are withdrawn one by one and loaded with the food to be cooked. This loading may be accomplished by gripping each skewer's handle 84 in the right hand, removing the drive connector 87 from the skewer's rod 83 by the left hand, loading the skewer with food pieces, and thereafter reinstalling the connector on the skewer. The skewer 11 is then lowered vertically into the interior of the glass chimney 115 through use of handle 84 only, the skewer connector's square post 93 being interengaged with a gear's square bore 47. In this ragard, such interengagement is easily accomplished without exact registry of this skewer connector's square post 93 with the gear's square bore 47 because of the radiused free end 98 of the square post. The free end 98 structure of the connector's post 93 locates that post in general axial relation with the gear's square bore 47, and slight twisting of the skewer 11 by the user through use of the handle 84 permits very easy registry and final sip fit assembly. The skewer 11 is then dropped down until the skewer's square shaft 93 is fully received in the gear's square bore 47 as determined by the shaft's seat 95 resting on the top surface 97 of the gear's axle 46. This skewer connector 87/gear 42, 43 structure also permits easy assembly of the skewer with the skewer drive mechanism 15 even when the gears 42, 43 are rotating, i.e., even when the cooker is operating. This for the reason, again, that exact registry of a skewer connector's square shaft 93 is not required with a gear's square bore 47 in order to achieve initial interengagement, with final interengagement being easily achieved once that initial interengagement has occurred as previously explained.

With one or more of all of the skewers 11 fully loaded, as desired by the user, and with those skewers installed with the drive mechanism 15 as shown in FIG. 3, the cooker is ready to be activated by off/on switch 79. Use of off/on switch 79, with the electric cord 75, 80 plugged in, energizes the center vertical heating element 13, and also activates the drive motor 55. This simultaneously causes the skewers 11 to rotate on their axes 45 as driven by the skewer drive mechanism 15. Rotation of these skewers 11 exposes the food sections thereon to the heat generated by the electric resistance heater 13, thereby cooking the food products. The evenness of cooking of the food products is promoted because of the chimney 115. The chimney 115, being upraised slightly above the drip tray 17 to provide a gap G between the cover's bottom edge 117 and the drip tray's top surface, in combination with the heat generated by the electric heater 13, promotes upward convection currents or air flow 114 within the glass cover and this aids in even cooking of the food products. Also this air flow 114, in combination with the skewer's handles 84 being positioned outside of, i.e., above, the chimney 115, aids in keeping the skewers' handles cool enough for handling by a user. Further, the glass chimney 115 also cooperates to cut down or reduce the time required to achieve thorough cooking of any given food products, relative to the time required if no chimney were used, since the chimney tends to retain the heat interiorly thereof. Additionally, the chimney 115 provides an important advantage in that it prevents splatter or other distant exterior discharge of food drippings, e.g., grease or the like, since any such splatter is onto the cover's interior surface, and directed downwardly onto the drip tray 17. This, of course, is a safety advantage. And it will be particularly noted that the height of the chimney 115 is such that all of the skewers' handles 84 extend above the cover's top edge 116. This permits the rotary cooker's user to grip the skewers' handles 84 and, thereby, remove or reinstall the skewers 11 relative to the cooker's drive mechanism 15, without reaching into the cover's interior, and without reaching into perhaps unsafe proximity to the cooker's heating element 13 or hot food on adjacent skewers. This is a very desirable feature, and is brought about because of the facts that the skewer's handles 84 extend above the cooker's chimney 115.

As the cooker 10 is used, the food drippings, e.g., grease or other food juices, that exude from the food pieces on the skewers 11 generally flow downwardly onto the drip tray 17. These drippings are prevented from following the skewer rod 83 into the housing's interior 100 because each skewer rod ends in blind bore 88 of the skewer's connector 87. In this regard, therefore, the drip shield 90 at the top end of each skewer's connector 87 deflects the drippings and insures that the drippings drain off the drip shields' edges onto the drip tray 17 since the diameter of each deflector 90 is substantially greater than the diameter of an associated port 102 in the drip tray (and associated bore 60 in the housing's ceiling plate 59) through which the connector 87 passes to achieve its innerconnection with a gear 42, 43 of the skewer drive mechanism 15. The drip tray 17 itself, as previously described, is domed from a high point at the center of the tray to a low point along the peripheral edge so that all drippings or splatterings onto the tray drain outwardly into trough 107 adjacent the tray's periphery. Further, the trough 107 defined around the tray's periphery is pitched or slanted from a high point 108 disposed opposite the drain hole 104 in that trough to the drain hole itself, thereby promoting flow of the drippings all around the tray's periphery toward the drain hole. The drain hole 104, as previously mentioned, is coaxially disposed above conduit 39 formed integral with the base's housing 20. This conduit 39 is positioned above collector cup 18 received in the housing's pocket 26. The collector cup 18 is retained in that pocket 26 by cooperative grooves 35 and ribs 34 partially carried by the collector cup's floor 33 and partially carried by the housing pocket's floor 30. The level of drippings in the collector cup is readily visible since the collector cup's handle 18b itself is hollow and provides a part of the cup's drippings storage capacity. The cup handle 18b extends outwardly beyond the housing's sidewall 22, and although positioned beneath one of the housing's handles 23a there is sufficient gap D between the cup's top edge 18c and the housing's handle to permit visual observation of drippings collected in the cup. When the cup is undesirably full, it may be removed simply by gripping the indentations 129 molded therein so as to remove it and empty it. If the housing's pocket 26 itself becomes undesirably dirty from spilled drippings, the housing pocket's floor plate 30 may be removed so that the pocket can be completely cleaned, too.

When use of the rotary cooker 10 is finished, and after the glass cover 115 has cooled, the glass cover itself may be easily and simply removed from operative combination with the cooker simply by gripping it along the finger groove 125 provided adjacent its top edge, and lifting it vertically upward off the base 14 until the cover's bottom edge clears the heating element 13 and any skewers 11 still assembled with the unit. No latches or other connector mechanism is required because the glass cover 115 itself is simply received in gravity fixed position on seats 119 carried by the drip tray 17. With the cover 115 removed, and with all the skewers 11 removed from operative combination with the base, the cooker's drip tray 17 also may be easily removed simply by lifting same vertically upward until it, too, clears the heating element 13. As with the glass cover 115, the drip tray 17 is not connected to the base 14 by any type of fastener either, outer flange 110 of the drip tray simply being received in annular groove 111 in the housing's outer face to properly position it in operative combination with the housing. The drip tray 17 itself, after cleaning, is reinstalled in a sequence opposite to its removal. And reinstallation of the drip tray 17 can be accomplished in only the proper operative position since tongue 112 on the drip tray must be properly positioned between the short legs 72c, 72d of the resistance heater element, that tongue will interfere with cross loop 66 between those two legs as it is lowered into position, and that cross loop interference with the tongue will prevent the tray 17 from being lowered all the way into proper operative combination with the housing. This, of course, would bring to the user's attention that the drip tray 17 is improperly oriented relative to the housing. Proper orientation relative to the housing for the drip tray 17 is desired so that the tray's drain hole 104 is properly positioned in overlying relation with the housing's conduit 39 and, therefore, with the collector cup.

Having described in detail the preferred embodiment of my invention, what we desire to claim and protect by Letters Patent is:

1. A rotary skewer cooker comprising
   a plurality of skewers, said skewers being generally vertically oriented,
   a skewer drive mechanism at least partially mounted in a housing, said skewer drive mechanism being selectively innerconnectable with each of said skewers for rotating each of said skewers relative to that skewer's axis,
   a heat source connected to said housing, said heat source being adapted to cook food on said skewers,
   a generally tubular chimney seated on said housing, said chimney extending upwardly from said housing so as to enclose food products carried on said skewers, said chimney being open at the top end thereof for permitting manual accessability to one end of each skewer during use of said cooker, said accessability allowing installation and removal of said skewers with said skewer drive mechanism in generally vertical fashion within said chimney relative to said housing during use of said cooker, and
   chimney seat structure partially carried by said chimney and partially carried by said housing, said seat structure being constructed so that an air gap is established between said housing and the bottom edge of said chimney when said chimney is in operative assembly with said housing, said air gap permitting air flow up through said chimney during use of said cooker.

2. A rotary skewer cooker as set forth in claim 1, said cooker comprising
   a handle on one end of each of said skewers, all of said handles extending upwardly beyond a phantom plane that includes the top edge of said chimney when said skewers are connected with said skewer drive mechanism and said chimney is installed on said base.

3. A rotary skewer cooker as set forth in claim 2, said chimney seat structure comprising
   at least one seat configured to allow vertically upward movement of said chimney relative to said housing for removal of said chimney for cleaning, but to prevent substantial radial movement of said chimney relative to said housing when said chimney is in operative assembly with said housing during use.

4. A rotary skewer cooker as set forth in claim 3, said chimney seat structure comprising
   at least three seats connected to said housing, said seats being spaced generally about said housing's periphery, and
   said chimney comprising
   an annular seat groove formed into the bottom edge of said chimney, said chimney's seat groove and said housing's seats cooperating to establish a generally annular air gap between the top surface of said housing and the bottom edge of said chimney about substantially the entire of said chimney's periphery.

5. A rotary skewer cooker as set forth in claim 4, said chimney comprising
   a finger groove positioned at least partially around the chimney at the top edge thereof, said finger groove permitting said chimney to be easily gripped by a user's fingers when it is desired that said chimeny be removed from or reinstalled with said housing.

6. A rotary skewer cooker as set forth in claim 1, said chimney being comprised of a transparent material.

* * * * *